United States Patent
Li et al.

(10) Patent No.: US 8,719,619 B2
(45) Date of Patent: May 6, 2014

(54) PERFORMANCE ENHANCEMENT TECHNIQUE FOR RAIDS UNDER REBUILD

(75) Inventors: Chao Guang Li, Shanghai (CN); Yao Peng, Shanghai (CN); Cheng-Chung Song, Tucson, AZ (US); Zhi Qiang Wang, Shanghai (CN); Hui Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 13/237,397

(22) Filed: Sep. 20, 2011

(65) Prior Publication Data

US 2013/0073900 A1    Mar. 21, 2013

(51) Int. Cl.
*G06F 11/00*         (2006.01)

(52) U.S. Cl.
USPC ......................................................... 714/6.22

(58) Field of Classification Search
USPC ......................................................... 714/6.22
See application file for complete search history.

(56) References Cited

U.S. PATENT DOCUMENTS

| | | | |
|---|---|---|---|
| 5,542,065 A | 7/1996 | Burkes et al. | |
| 6,647,514 B1 * | 11/2003 | Umberger et al. | 714/42 |
| 6,996,742 B2 * | 2/2006 | Lerman et al. | 714/6.22 |
| 7,490,270 B2 * | 2/2009 | Cherian | 714/42 |
| 7,774,542 B2 | 8/2010 | Zhang et al. | |
| 8,363,519 B2 * | 1/2013 | Lubbers et al. | 369/47.1 |
| 8,555,019 B2 * | 10/2013 | Montgomery et al. | 711/165 |
| 8,566,547 B2 * | 10/2013 | Montgomery et al. | 711/165 |
| 2004/0059958 A1 * | 3/2004 | Umberger et al. | 714/5 |
| 2006/0112302 A1 * | 5/2006 | Cherian | 714/6 |
| 2010/0251012 A1 | 9/2010 | Zwisler et al. | |
| 2011/0066808 A1 | 3/2011 | Flynn et al. | |

* cited by examiner

*Primary Examiner* — Joshua P Lottich
(74) *Attorney, Agent, or Firm* — Nelson and Nelson; Daniel P. Nelson; Alexis V. Nelson (57) ABSTRACT

A method for improving the performance of a RAID under rebuild is disclosed. In one embodiment, such a method includes identifying a RAID requiring rebuild, such as by identifying a RAID having one or more failed storage-drive components. The method then automatically performs the following in response to identifying the RAID: the method identifies hot extents (i.e., extents most heavily accessed) in the RAID; the method migrates the hot extents from the identified failed RAID to a normal RAID not requiring rebuild, such as to an underused RAID; and the method rebuilds the failed RAID. The migration of the hot extents will ideally occur while the RAID is being rebuilt but may also be performed prior to the rebuild process. A corresponding apparatus and computer program product are also disclosed.

20 Claims, 6 Drawing Sheets

PERFORMANCE ENHANCEMENT TECHNIQUE FOR RAIDS UNDER REBUILD

BACKGROUND

1. Field of the Invention

This invention relates to apparatus and methods for improving the performance of redundant arrays of independent disks (RAIDs) when undergoing a rebuild process.

2. Background of the Invention

A RAID (i.e., a Redundant Array of Independent Disks) is a storage technology that provides increased storage functions and reliability through redundancy. A RAID is created by combining multiple disk-drive components (or other storage components such as solid state drives) into a logical unit. Data is then distributed across the drives using one of various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

When a disk-drive component of a RAID fails, the RAID may be rebuilt to restore data redundancy. This may be accomplished by replacing the failed disk-drive component with a standby disk-drive component and copying and/or regenerating the lost data on the standby disk-drive component. Ideally, the RAID will be rebuilt as expeditiously as possible to minimize the possibility that another disk-drive component will fail and result in permanent data loss.

When a RAID is being rebuilt due to a disk failure, the RAID controller typically has to utilize bandwidth and/or processing resources to reconstruct the lost data. In many cases, the RAID controller must also continue to process read and write operations. As a result, both the rebuild time and the read/write response time are negatively impacted due to the competition for resources. If more resources are dedicated to rebuilding the RAID, the I/O performance suffers. If more resources are dedicated to servicing I/O requests, the rebuild time is extended. The longer rebuild time increases the probability that a failure will occur that results in permanent data loss.

In view of the foregoing, what are needed are apparatus and methods to improve the performance of RAIDs during a rebuild process. Ideally, such apparatus and methods will minimize the impact on both I/O performance and rebuild time.

SUMMARY

The invention has been developed in response to the present state of the art and, in particular, in response to the problems and needs in the art that have not yet been fully solved by currently available apparatus and methods. Accordingly, the invention has been developed to provide apparatus and methods to improve the performance of RAIDs under rebuild. The features and advantages of the invention will become more fully apparent from the following description and appended claims, or may be learned by practice of the invention as set forth hereinafter.

Consistent with the foregoing, a method for improving the performance of a RAID under rebuild is disclosed. In one embodiment, such a method includes identifying a RAID requiring rebuild, such as by identifying a RAID having one or more failed storage-drive components. The method then automatically performs the following in response to identifying the RAID: the method identifies hot extents (i.e., extents most heavily accessed) in the RAID; the method migrates the hot extents from the identified failed RAID to a normal RAID not requiring rebuild, such as to an underused RAID; and the method rebuilds the failed RAID. The migration of the hot extents will ideally occur while the RAID is being rebuilt but may also be performed prior to the rebuild process.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
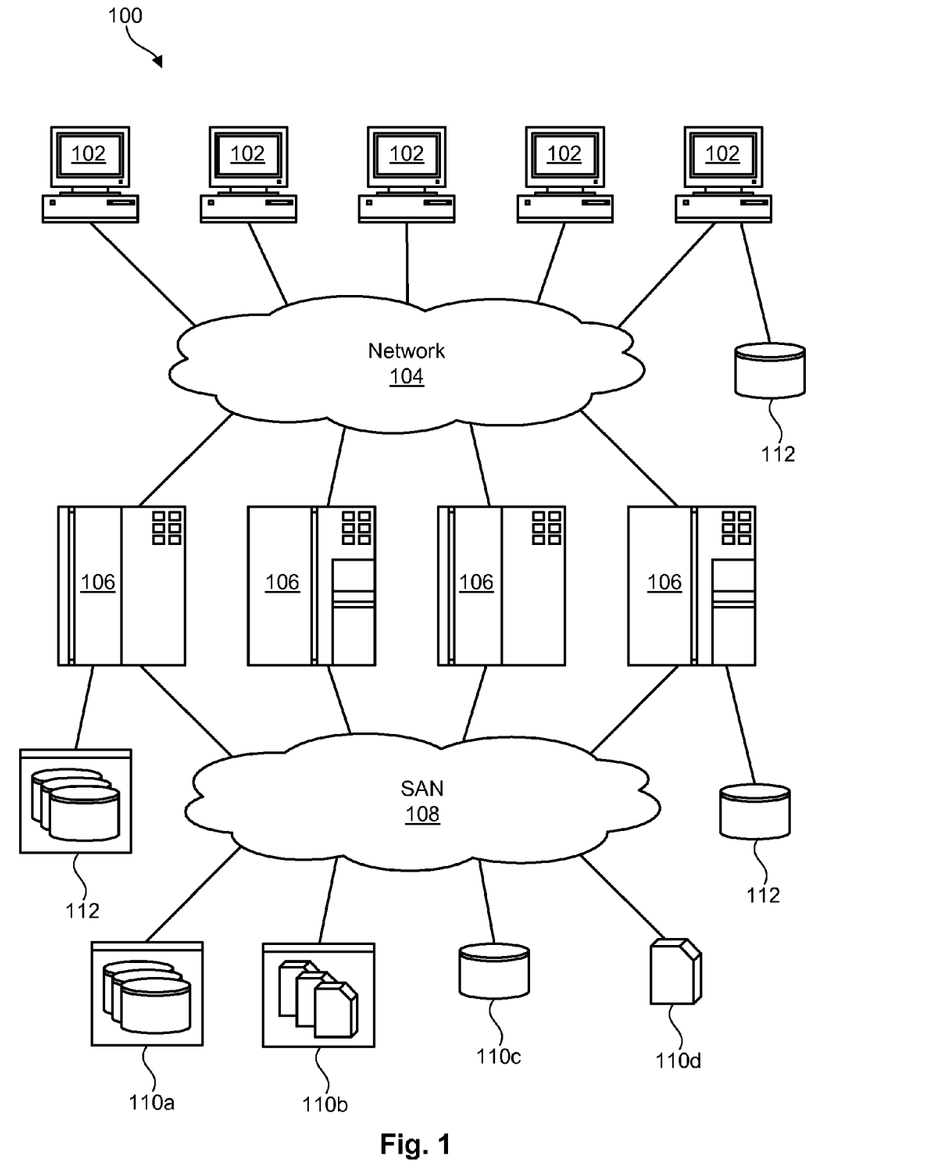
FIG. 1 is a high-level block diagram showing one example of a network architecture in which embodiments of the invention might operate.

Referring to FIG. 1, one example of a network architecture 100 is illustrated. The network architecture 100 is presented to show one example of an environment where embodiments of the invention might operate. The network architecture 100 is presented only by way of example and not limitation. Indeed, the apparatus and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

In certain embodiments, RAIDs may be implemented in one or more of the storage systems 110a, 112 (e.g., storage systems 110a, 112 containing arrays of hard-disk drives and/or solid-state drives) to provide data redundancy. In the event a RAID fails and requires rebuild, a performance enhancement technique in accordance with the invention may be implemented to improve the performance of the RAID during the rebuild process. This performance enhancement technique will be described in more detail hereafter.

Figure 2:
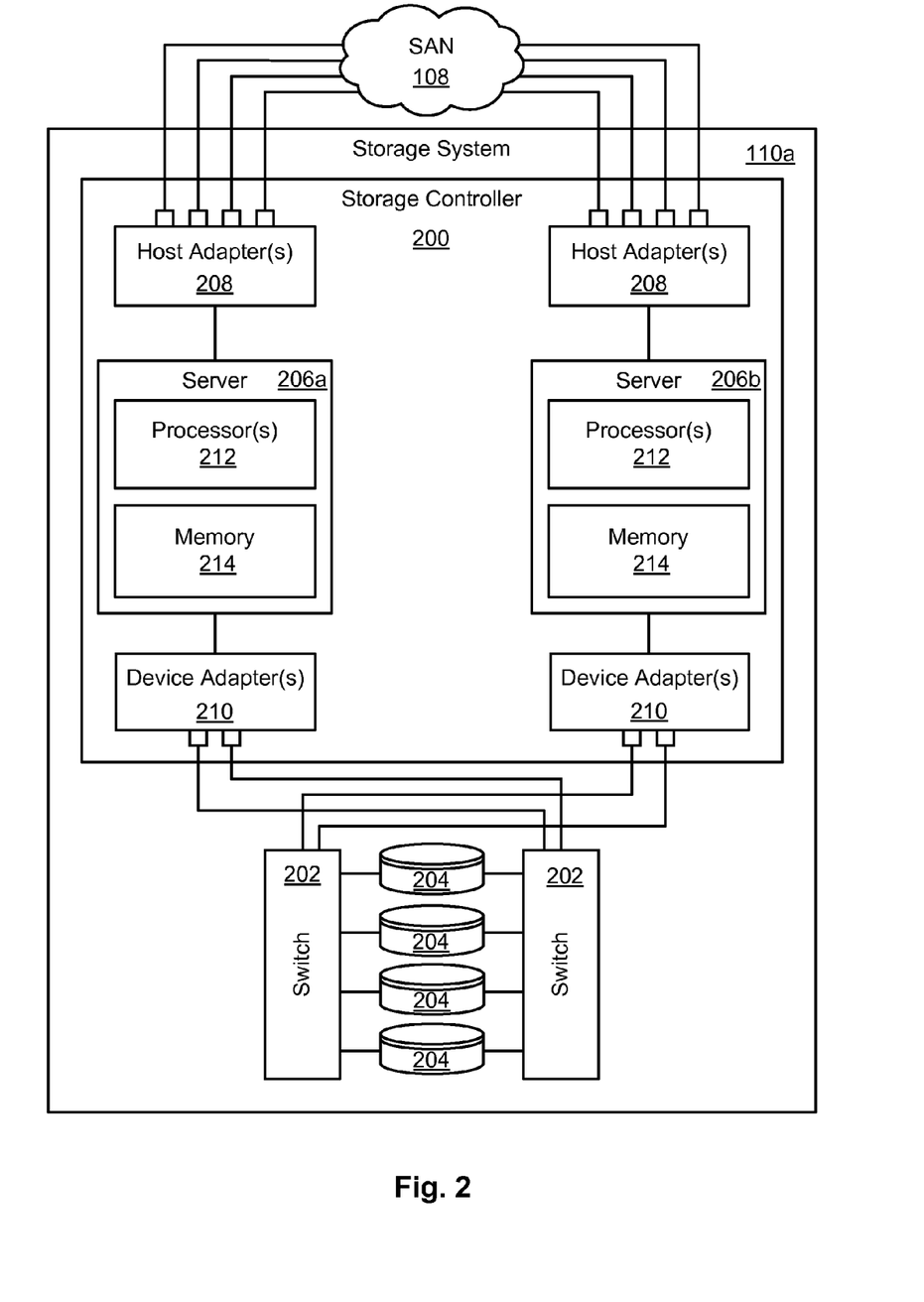
FIG. 2 is a high-level block diagram showing one example of a storage system in which embodiments of the invention might operate.

Referring to FIG. 2, one example of a storage system 110a containing an array of hard-disk drives 204 and/or solid-state drives 204 is illustrated. The internal components of the storage system 110a are shown since the performance enhancement techniques disclosed herein may, in certain embodiments, be implemented within such a storage system 110a, although the techniques may also be applicable to other storage systems 110. As shown, the storage system 110a includes a storage controller 200, one or more switches 202, and one or more storage drives 204, such as hard disk drives 204 or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the methods disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and is not intended to be limiting.

Figure 3:
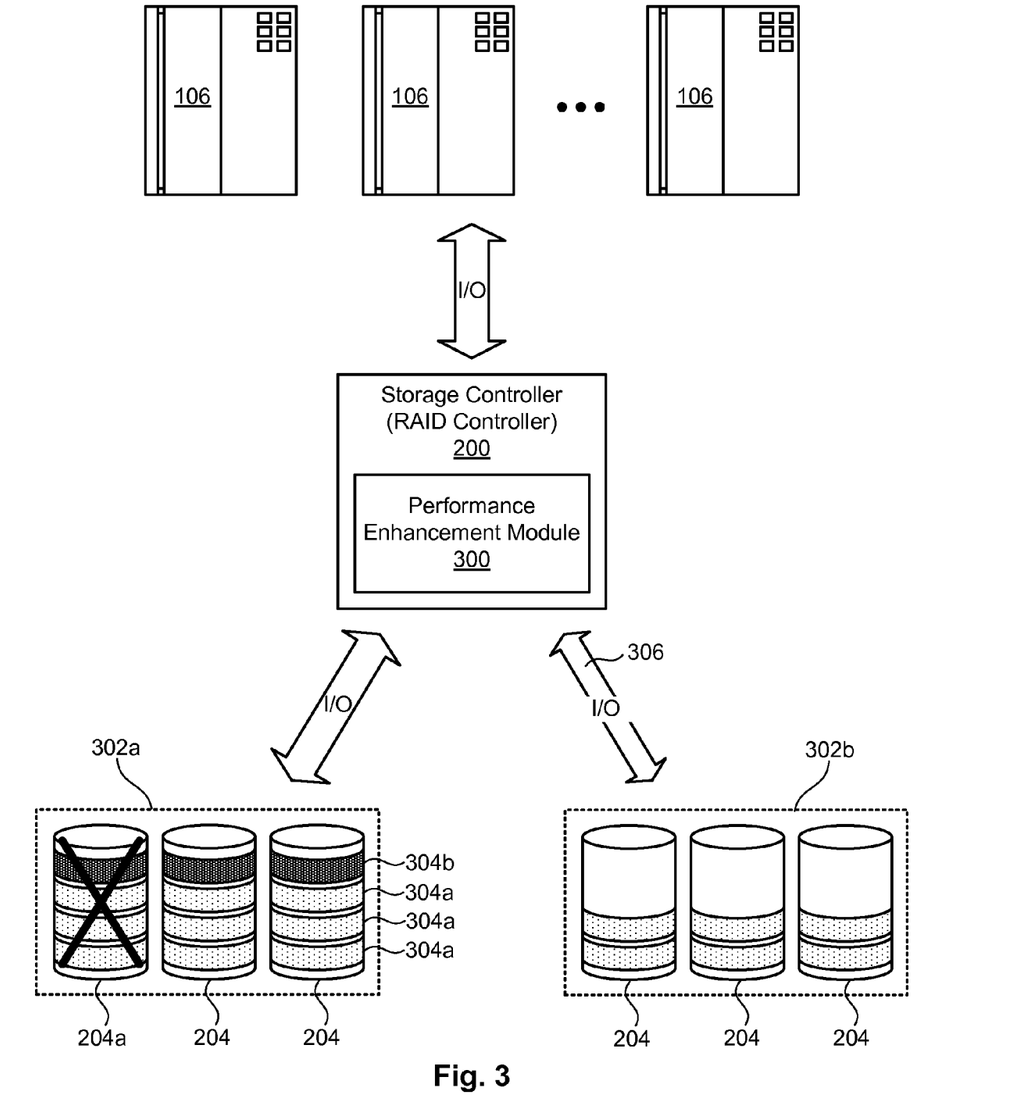
FIG. 3 is a high-level block diagram showing an example of a RAID that has experienced a failure.

Referring to FIG. 3, one example of a storage controller 200 (i.e., a RAID controller 200) communicating with one or more RAIDs 302 (in this example RAIDs 302 using three storage drives 204) is illustrated. The RAID controller 200 may be implemented in hardware, software, or a combination thereof. The RAID controller 200 may manage storage drives 204 (i.e., hard disk drives 204 and/or solid state drives 204) and present them to one or more host devices 106 as logical units. If a storage drive 204 in a RAID 302 fails (thereby destroying the data redundancy), the RAID controller 200 may rebuild the RAID 302 using a spare storage drive 204, thereby restoring data redundancy. Ideally, the RAID 302 will be rebuilt as expeditiously as possible to minimize the possibility that another storage drive 204 will fail and result in permanent data loss.

As previously mentioned, when a RAID 302 is being rebuilt, a RAID controller 200 typically utilizes bandwidth and/or processing resources to reconstruct the lost data. In many cases, the RAID controller 200 must also continue to process read and write requests. As a result, both the rebuild time and the read/write response time may be negatively impacted by the rebuild process. If more resources are dedicated to rebuilding the RAID 302, I/O performance suffers. If more resources are dedicated to servicing I/O requests, the rebuild time is extended, increasing the chances of permanent data loss.

To improve the performance of a RAID 302 undergoing the rebuild process, a performance enhancement module 300 may be provided in the storage controller 200. This performance enhancement module 300 may be a stand-alone module or be incorporated into another product, such as a storage-management product. The performance enhancement module 300 may minimize, as much as possible, impacts to both rebuild time and read/write response time during RAID rebuild. The function and operation of the performance enhancement module 300 is described in the following paragraphs.

Figure 4:
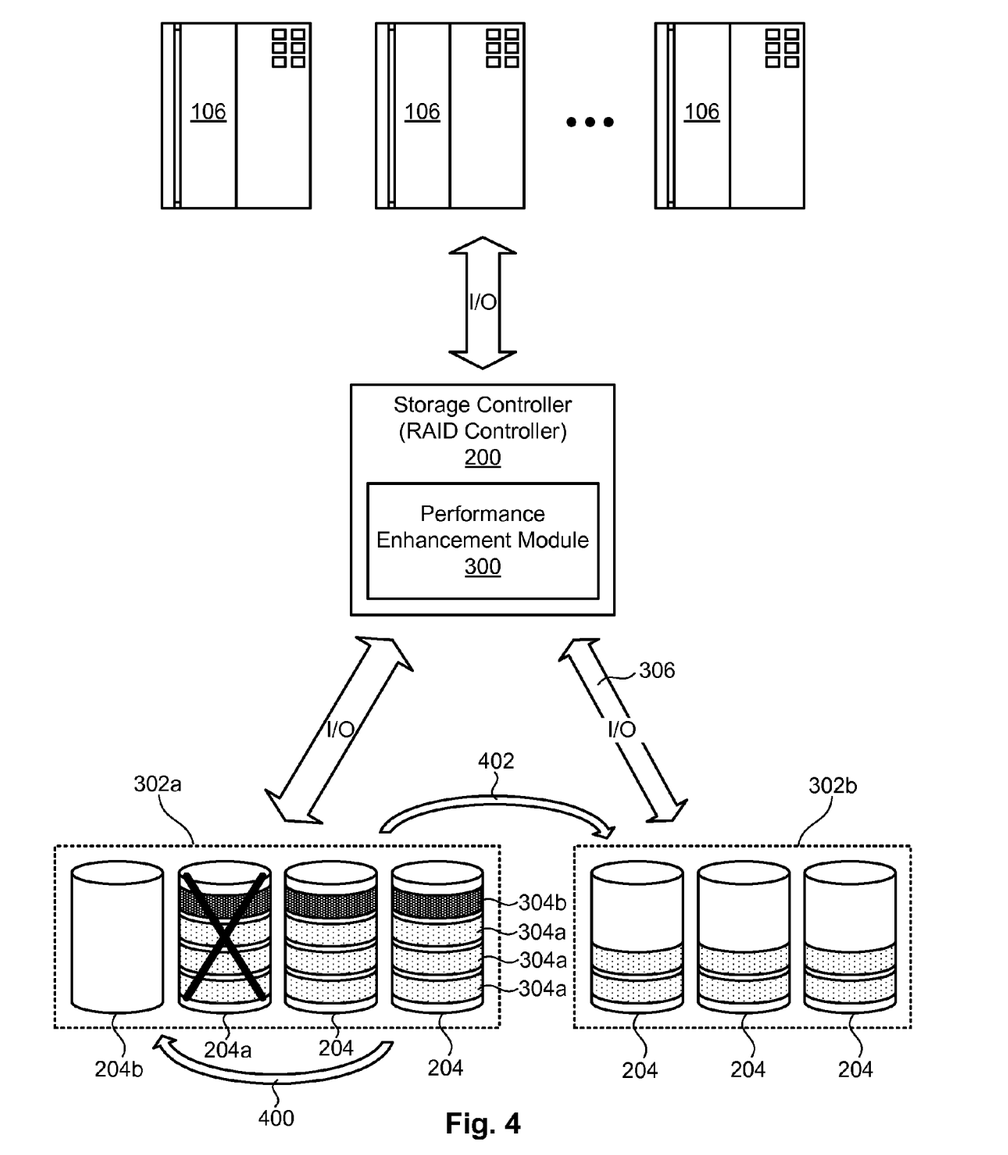
FIG. 4 is a high-level block diagram showing how hot extents are migrated from the failed RAID to a normal RAID while the failed RAID is being rebuilt.
Figure 5:
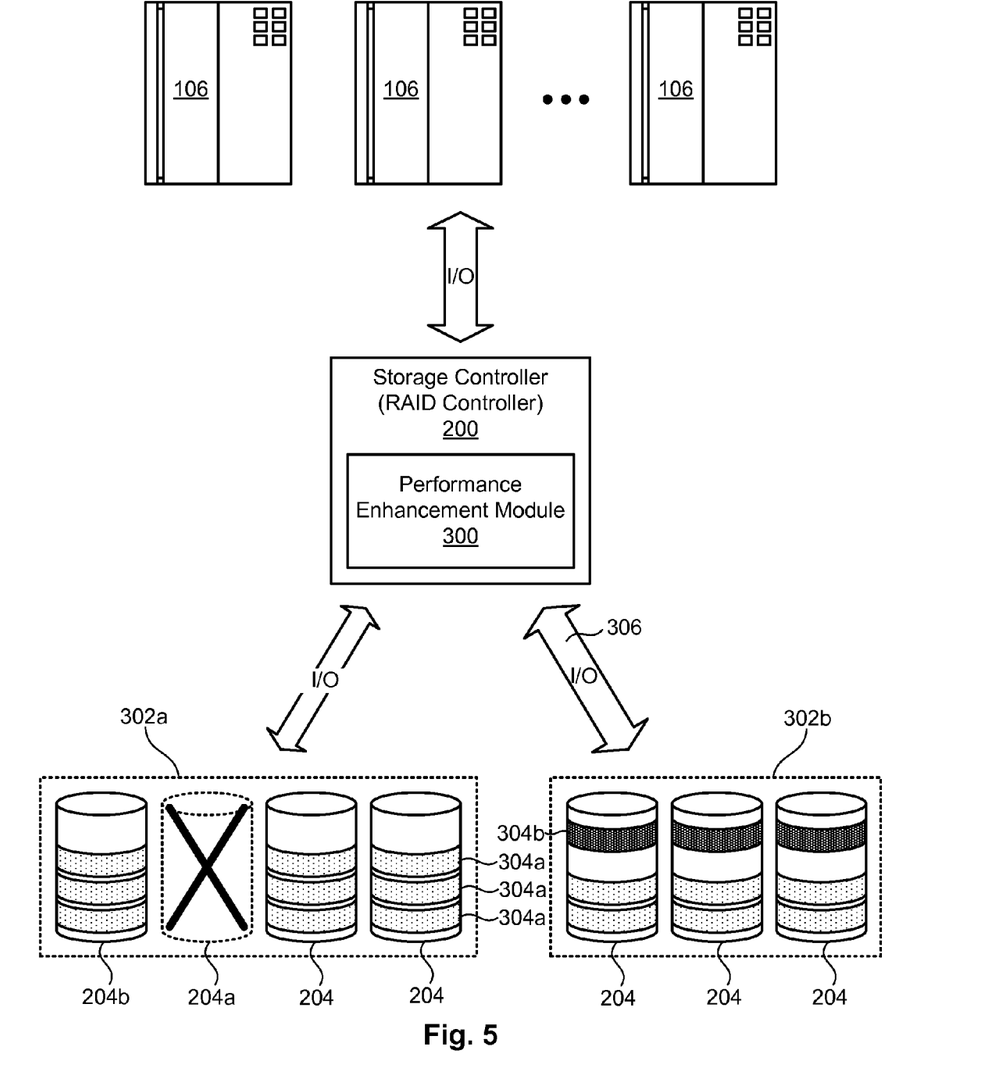
FIG. 5 shows the state of the failed RAID and the normal RAID after the failed RAID has been rebuilt.

Assume, for the sake of example, that a storage drive 204a of a first RAID 302a managed by the storage controller 200 fails. This failure eliminates the data redundancy in the first RAID 302a. In response to the failure, the performance enhancement module 300 identifies one or more "hot" extents 304b in the RAID 302a. For the purpose of this disclosure, "hot" extents 304b are extents that are most heavily used (i.e., receive the most I/O) in a RAID 302. In FIGS. 3 through 5, hot extents 304b are shaded to differentiate them from colder extents 304a (extents that are less heavily used).

In order to identify hot extents 304b in the RAID 302a, the usage of data in the RAID 302a may be monitored and recorded over a period of time. This monitoring may be performed by functionality in the performance enhancement module 300 or functionality in other modules (e.g., IBM's Easy Tier or other usage tracking products). The performance enhancement module 300 may analyze information documenting the data usage to identify which extents in the RAID 302a are most heavily used.

The performance enhancement module 300 may also identify a normal RAID 302b that may be used to store the hot extents 304b from the failed RAID 302a. This may be a RAID 302b that can absorb additional I/O and/or has sufficient empty space to accommodate the hot extents 304b. In certain embodiments, the performance enhancement module 300 selects a RAID 302b that is underused and/or is able to absorb additional I/O stress. The normal RAID 302b may be a RAID 302b that is managed by the same storage controller 200 as the failed RAID 302a or a RAID 302 that is managed by a different storage controller 200 or located on an entirely different storage system which is accessible over a network. As shown in FIG. 3, in certain cases, the amount of I/O (as indicated by the size of the arrow 306) of the selected normal RAID 302b may be significantly less than the amount of I/O normally received by the failed RAID 302a.

Referring to FIG. 4, in order to rebuild the failed RAID 302, the RAID controller 200 initially identifies a spare storage drive 204b to use to reestablish the data redundancy. The RAID controller 200 may then begin to reconstruct the lost data and write the reconstructed data to the spare storage drive 204b, as indicated by the arrow 400. As mentioned above, this process is ideally performed as quickly as possible to reduce the chance that another storage drive 204 will fail and cause permanent data loss.

To reduce the negative impact that the rebuild process has on the failed RAID's I/O performance, the performance enhancement module 300 migrates the hot extent(s) 304b discussed above to the normal RAID 302b, as shown by the arrow 402. In certain embodiments, if more than one hot extent 304b is migrated, the hot extent(s) will be migrated in the order of their hotness to maximize the positive effect of the migration. This will transfer the I/O associated with the hot extent(s) 304b from the RAID 302a under rebuild to the normal RAID 302b. This will allow the RAID controller 200 to dedicate more resources to rebuilding the RAID 302a, as opposed to servicing I/O requests to the hot extent(s) 304b of the RAID 302a. The I/O workload for the hot extent(s) 304b will be transferred to the normal RAID 302b. This will improve read/write times for the hot extent(s) 304b since they will not need to share bandwidth and processing resources with the RAID rebuild process.

Referring to FIG. 5, when the rebuild process is complete, the spare storage drive 204b will become part of the RAID 302a and restore the data redundancy. The failed storage drive 204a will no longer be part of the RAID 302a. The hot extent(s) 304b will have been moved from the rebuilt RAID 302a to the normal RAID 302b, thereby redirecting their I/O to the normal RAID 302b (as shown by the size of the arrow 306). If desired, the hot extent(s) 304b may be migrated back to the rebuilt RAID 302a at this time, although this is not necessary.

The order in which the above-described steps are executed may vary. In certain embodiments, the rebuild process may commence as soon as the failure is detected in the RAID 302a to minimize the chance that another storage drive 204 will fail before the rebuild is complete. In such embodiments, the steps needed to identify the hot extent(s) 304b, identify the normal RAID 302b, and migrate the hot extent(s) 304b to the normal RAID 302b will occur during the rebuild process. Nevertheless, in other embodiments, the steps of identifying the hot extent(s) 304b, identifying the normal RAID 302b, and migrating the hot extent(s) 304b to the normal RAID 302b may occur prior to initiating the rebuild process. This will ensure that all resources used to service I/O requests to the hot extent(s) 304b may be dedicated to the rebuild process.

The process described above in association with FIGS. 3 through 5 relies on the rule of thumb that eighty percent of the I/O occurs to twenty percent of the storage resources. Thus, by migrating twenty percent of the hottest extents 304b, eighty percent of the I/O workload may be transferred to another RAID 302b. This allows substantially more resources to be dedicated to rebuilding the failed RAID 302a instead of servicing I/O requests. The 80/20 rule is provided only by way of example. In other embodiments, a smaller or larger percentage or number of hot extents 304b may be migrated from the failed RAID 302a to the normal RAID 302b. In certain embodiments, the number of extents 304b migrated to a normal RAID 302b may be limited to a maximum number or percentage or be adjusted based on the additional stress the normal RAID 302b (or RAIDs 302b) can absorb.

The above-described performance enhancement techniques may be used with RAIDs of various different RAID levels (e.g., RAID levels 1-6) and are not limited to any particular RAID level. Similarly, the described performance enhancement techniques are compatible with RAIDs containing different numbers of storage drives 204. Accordingly, the above-described techniques and configurations are provided only by way of example and not limitation.

Figure 6:
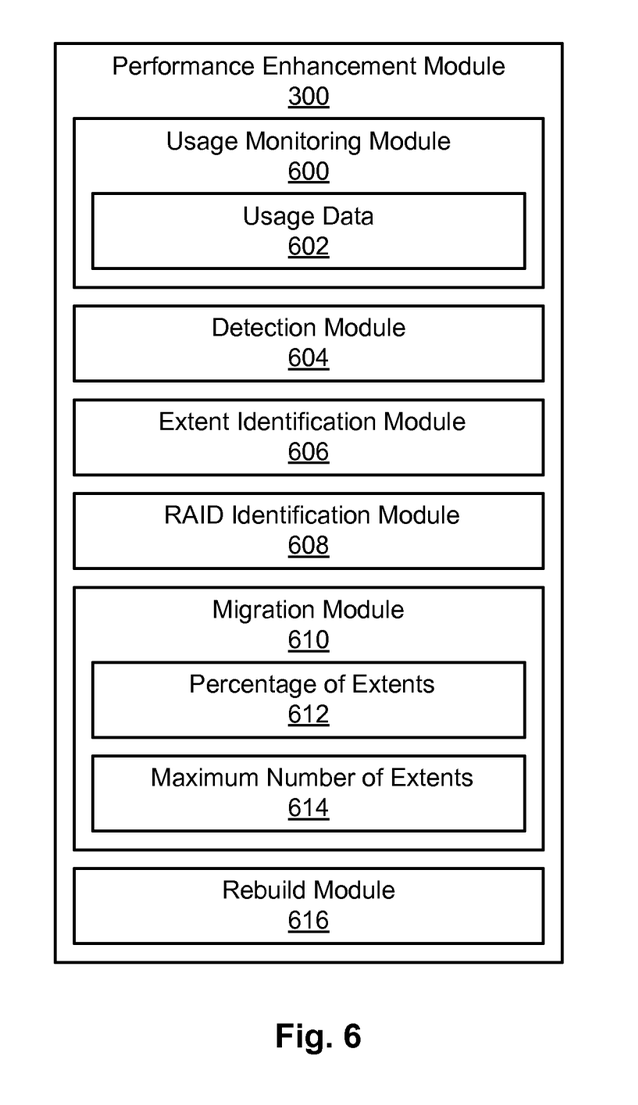
FIG. 6 shows various modules that may be used to implement an apparatus and method in accordance with the invention.

Referring to FIG. 6, to provide the functionality described above as well as provide additional functionality, the performance enhancement module 300 may include one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in the performance enhancement module 300 may actually be provided by other modules, such as modules existing in other software products. Thus, the location of the modules is presented only by way of example and is not intended to be limiting.

As shown, in certain embodiments, the performance enhancement module 300 may include one or more of a usage monitoring module 600, a detection module 604, an extent identification module 606, a RAID identification module 608, a migration module 610, and a rebuild module 616.

The usage monitoring module 600 may be configured to monitor and record data usage information for extents 304 of a RAID 302a or other volumes over a period of time. As shown, the usage monitoring module 600 is included in the performance enhancement module 300. In other embodiments, the performance enhancement module 300 uses a usage monitoring module 600 in another application (e.g., by leveraging functionality in IBM's Easy Tier or another product that tracks data usage). In certain embodiments, the usage monitoring module 600 generates usage data 602 that documents the usage of each extent 304 (i.e., the I/O directed to each extent) over a period of time.

A detection module 604 may be used to detect when a RAID 302 has experienced a failure, such as a failure of one or more storage drives 204 in the RAID 302. In response to such a failure, an extent identification module 606 identifies one or more hot extents 304b in the failed RAID 302. In certain embodiments, the extent identification module 606 identifies the hot extents 304b by analyzing the usage data 602. More specifically, the extent identification module 606 may analyze the usage data 602 to determine which extents 304 of the failed RAID 302 are most heavily used. In other embodiments, the usage monitoring module 600 records data hotness in the usage data 602 and the extent identification module 606 simply reads the usage data 602 to determine the hotness of the extents 304.

A RAID identification module 608 identifies a normal RAID 302 (or several normal RAIDs 302) that may be used to store the hot extents 304b from the failed RAID 302. As previously mentioned, this may be a RAID 302 or RAIDs 302 that can handle additional I/O and/or a RAID 302 or RAIDs 302 that have sufficient empty space to accommodate the identified hot extents 304b. In certain embodiments, the RAID identification module 608 makes this determination by analyzing the usage data 602. For example, the RAID identification module 608 may make this determination by identifying a normal RAID 302 or RAIDs 302 containing the coldest data.

Once the hot extents 304b and a normal RAID 302 or RAIDs 302 to which to move these hot extents 304 is identified, a migration module 610 migrates the hot extents 304b to the one or more normal RAIDs 302. In certain embodiments, the hot extent(s) will be migrated from hottest to coldest to reduce the I/O on the failed RAID 302 as expeditiously as possible. This will transfer the I/O associated with the hot extent(s) 304 from the failed RAID 302a to the one or more normal RAIDs 302, thereby allowing the RAID controller 200 to dedicate more resources to the rebuild process. In certain embodiments, migrating a hot extent includes reading a full stripe of the RAID 302a, particularly if the stripe has not been rebuilt yet. In certain cases, reading less than a full stripe may place a burden on the rebuild process. Thus, the data migration process may be designed such that it does not place an additional burden on the rebuild process.

In certain embodiments, the migration module 610 migrates a certain percentage 612 (e.g., twenty percent) of the hottest extents 304 in the failed RAID 302. In other embodiments, the migration module 610 only migrates up to a maximum number 614 of extents 304. In yet other embodiments, the maximum number 614 or percentage 612 of extents 304 that are migrated are adjusted based on the amount of additional stress a normal RAID 302 or RAIDs 302 can handle.

A rebuild module 616 may be configured to rebuild the failed RAID 302 to restore data redundancy. More particularly, the rebuild module 616 may reconstruct lost data and write the data to a spare storage drive 204b. As mentioned above, this process is ideally performed as expeditiously as possible to reduce the chance that permanent data loss will occur. In certain embodiments, the rebuild module 616 is configured to operate simultaneously with the extent identification module 606, RAID identification module 608, and migration module 610. That is, the steps of identifying the hot extent(s) 304, identifying the normal RAID 302b, and migrating the hot extent(s) 304b to the normal RAID 302b may occur during the rebuild process. In other embodiments, one or more of the extent identification module 606, RAID identification module 608, and migration module 610 may operate prior to the rebuild module 616.

The flowcharts and block diagrams in the Figures illustrate the architecture, functionality, and operation of possible implementations of systems, methods, and computer-usable media according to various embodiments of the present invention. In this regard, each step in the flowcharts or block diagrams may represent a module, segment, or portion of code, which comprises one or more executable instructions for implementing the specified logical function(s). It should also be noted that, in some alternative implementations, the functions noted in a step may occur out of the order noted in the Figures. For example, two steps shown in succession may, in fact, be executed substantially concurrently, or steps may sometimes be executed in the reverse order, depending upon the functionality involved. It will also be noted that each step of the block diagrams and/or flowchart illustrations, and combinations of steps in the block diagrams and/or flowchart illustrations, may be implemented by special purpose hardware-based systems that perform the specified functions or acts, or combinations of special purpose hardware and computer instructions.

The invention claimed is:

1. A method for improving the performance of a RAID under rebuild, the method comprising:
   identifying a RAID requiring rebuild;
   automatically performing the following in response to identifying the RAID:
      identifying hot extents on the RAID, the hot extents comprising the most heavily accessed extents on the RAID;
      migrating the hot extents from the RAID to a normal RAID not requiring rebuild; and
      rebuilding the RAID.

2. The method of claim 1, wherein migrating the hot extents comprises migrating the hot extents while rebuilding the RAID.

3. The method of claim 1, wherein migrating the hot extents comprises migrating the hot extents prior to rebuilding the RAID.

4. The method of claim 1, wherein identifying the hot extents comprises analyzing historical usage data to identify the hot extents.

5. The method of claim 1, wherein migrating the hot extents comprises migrating between 10 to 30 percent of the extents on the RAID to the normal RAID.

6. The method of claim 5, wherein migrating the hot extents comprises migrating 20 percent of the extents on the RAID to the normal RAID.

7. The method of claim 1, wherein the normal RAID is an underused normal RAID.

8. The method of claim 1, wherein migrating the hot extents comprises migrating up to a specified number of hot extents.

9. A computer program product for improving the performance of a RAID under rebuild, the computer program product comprising a non-transitory computer-readable storage medium having computer-usable program code embodied therein, the computer-usable program code comprising:
   computer-usable program code to identify a RAID requiring rebuild; and
   computer-usable program code to automatically perform the following in response to identifying the RAID:
      identify hot extents on the RAID, the hot extents comprising the most heavily accessed extents on the RAID;
      migrate the hot extents from the RAID to a normal RAID not requiring rebuild; and
      rebuild the RAID.

10. The computer program product of claim 9, wherein migrating the hot extents comprises migrating the hot extents while rebuilding the RAID.

11. The computer program product of claim 9, wherein migrating the hot extents comprises migrating the hot extents prior to rebuilding the RAID.

12. The computer program product of claim 9, wherein identifying the hot extents comprises analyzing historical usage data to identify the hot extents.

13. The computer program product of claim 9, wherein migrating the hot extents comprises migrating between 10 to 30 percent of the extents of the RAID to the normal RAID.

14. The computer program product of claim 13, wherein migrating the hot extents comprises migrating 20 percent of the extents of the RAID to the normal RAID.

15. The computer program product of claim 9, wherein the normal RAID is an underused normal RAID.

16. The computer program product of claim 9, wherein migrating the hot extents comprises migrating up to a specified number of hot extents.

17. An apparatus for improving the performance of a RAID under rebuild, the apparatus comprising:
   at least one processor;
   at least one memory device coupled to the at least processor and storing computer instructions for execution on the at least one processor, the computer instructions causing the at least one processor to collectively:
      identify a RAID requiring rebuild;
      identify hot extents on the RAID, the hot extents comprising the most heavily accessed extents on the RAID;
      migrate the hot extents from the RAID to a normal RAID not requiring rebuild; and
      rebuild the RAID.

18. The apparatus of claim 17, wherein migrating the hot extents comprises migrating the hot extents while rebuilding the RAID.

19. The apparatus of claim 17, wherein migrating the hot extents comprises migrating the hot extents prior to rebuilding the RAID.

20. The apparatus of claim 17, wherein migrating the hot extents comprises migrating between 10 to 30 percent of the extents of the RAID to the normal RAID.

* * * * *